(12) United States Patent
Kizhner

(10) Patent No.: US 9,013,490 B2
(45) Date of Patent: Apr. 21, 2015

(54) HILBERT-HUANG TRANSFORM DATA PROCESSING REAL-TIME SYSTEM WITH 2-D CAPABILITIES

(75) Inventor: Semion Kizhner, Reisterstown, MD (US)

(73) Assignee: The United States of America as represented by the Administrator of the National Aeronautics Space Administration, Washington, DC (US)

(*) Notice: Subject to any disclaimer, the term of this patent is extended or adjusted under 35 U.S.C. 154(b) by 140 days.

(21) Appl. No.: 13/474,367

(22) Filed: May 17, 2012

(65) Prior Publication Data
US 2013/0307858 A1    Nov. 21, 2013

(51) Int. Cl.
*G06F 15/00* (2006.01)
*G06T 1/00* (2006.01)
*G06T 5/00* (2006.01)
*G06T 5/10* (2006.01)
*G06T 5/20* (2006.01)

(52) U.S. Cl.
CPC . *G06T 5/10* (2013.01); *G06T 5/002* (2013.01); *G06T 5/20* (2013.01); *G06T 2207/20032* (2013.01)

(58) Field of Classification Search
None
See application file for complete search history.

(56) References Cited

U.S. PATENT DOCUMENTS

| | | | |
|---|---|---|---|
| 8,428,389 B2 * | 4/2013 | Pao et al. | 382/267 |
| 8,660,848 B1 * | 2/2014 | Humi | 704/270 |
| 2010/0092028 A1 * | 4/2010 | Huang et al. | 382/100 |
| 2011/0052088 A1 * | 3/2011 | Yuan et al. | 382/248 |

OTHER PUBLICATIONS

Bhuiyan et al. ("A novel approach of fast and adaptive bidimensional empirical mode decomposition", IEEE, 2008, p. 1313-1316).*
"A Novel approach of fast and adaptive bidimensional empriical mode decomposition" IEEE, 2008, 1-4244-1484-9/08, pp. 1313-1316.*
"Improved bi-dimensional EMD and Hilbert spectrum for the analysis of textures", Pattern Recognition 42, 2009, pp. 718-734.*

* cited by examiner

*Primary Examiner* — David Zarka
*Assistant Examiner* — Khoa Vu

(57) ABSTRACT

Some embodiments of the present invention pertain to an apparatus, method, and a computer program that is configured to cause a processor to construct an upper envelope and lower envelope for an input image based on a statistically computed window parameter in a real-time system using multi-thread processing, and smooth the upper envelope and lower envelope based on a sum of elements in a window, wherein the sum of elements in the window is divided by a number of non-zero elements in the sum of elements in the window.

8 Claims, 4 Drawing Sheets

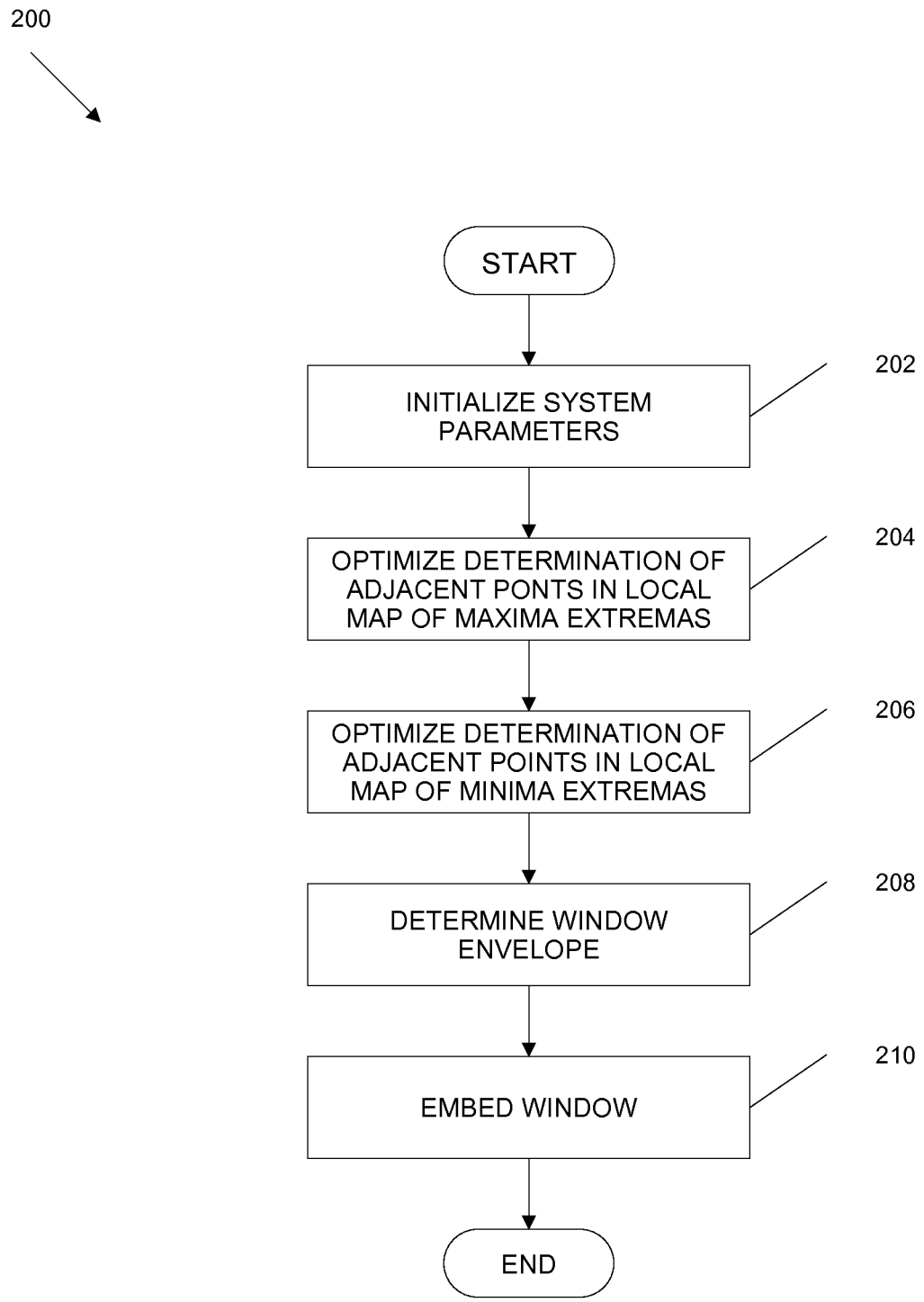

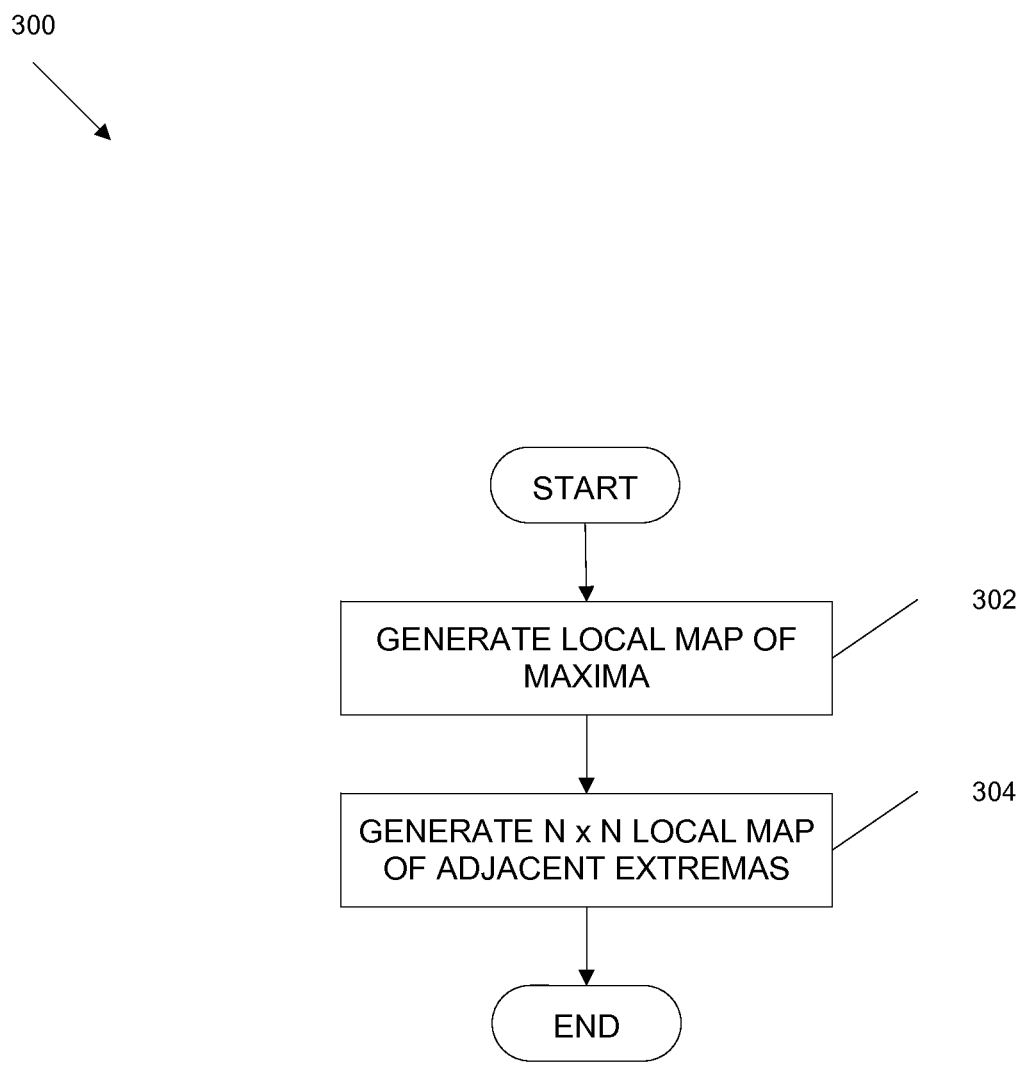

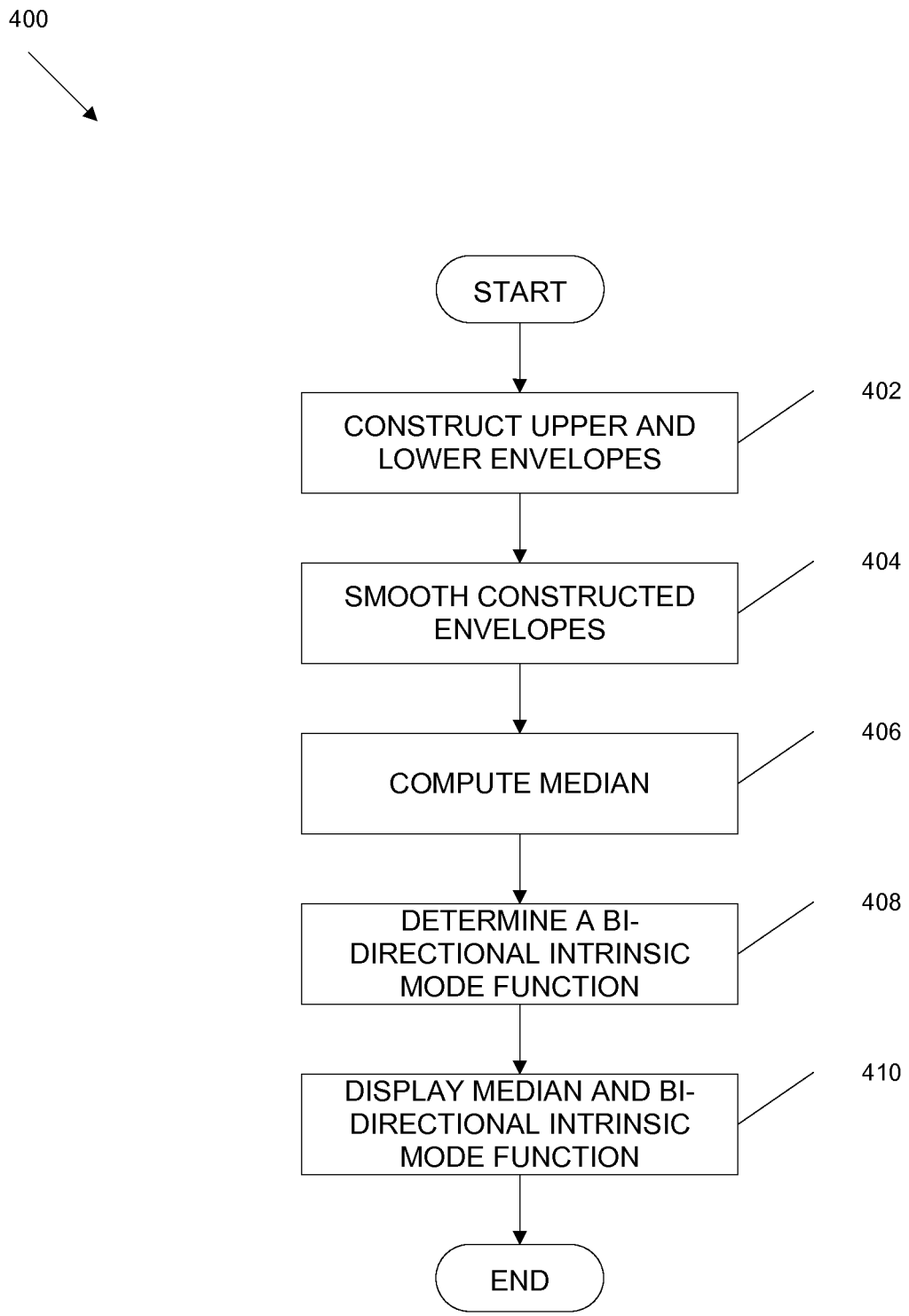

HILBERT-HUANG TRANSFORM DATA PROCESSING REAL-TIME SYSTEM WITH 2-D CAPABILITIES

ORIGIN OF THE INVENTION

The invention described herein was made by an employee of the United States Government, and may be manufactured and used by or for the Government for Government purposes without the payment of any royalties thereon or therefore.

FIELD

The present invention relates to a data processing system, and more particularly, to a real-time Hilbert-Huang Transform data processing system with 2-D capabilities.

BACKGROUND

Unlike other digital signal processing techniques such as the Fast Fourier Transform (FFT) for one-dimensional (1-D) (FFT1) and two-dimensional (2-D) (FFT2) data that assume signal linearity and stationarity, the Hilbert-Huang Transform (HHT) utilizes relationships between an arbitrary signal's local extrema to find a signal instantaneous spectral representation. This can be done in two steps. In the first step, the Huang Empirical Mode Decomposition (EMD) separates an input signal of one variable s(t) into a finite set of narrow-band Intrinsic Mode Functions—$\{IMF_1(t), IMF_2(t) \ldots IMF_k(t)\}$ that add up to signal s(t). Next, the HHT applies the Hilbert Transform to each $IMF_i(t)$ signal constituent to obtain the corresponding analytical signal $S_i(t)$. From the analytical signal, the HHT generates the Hilbert Spectrum $\{\omega(IMF_1(t), \omega(IMF_2(t) \ldots \omega(IMF_k(t))\}$ at each domain argument t for signal s(t) that was otherwise unobtainable. However, the state-of-the-art HHT Data Processing System (HHT-DPS) works only for 1-D data, as designed, and it is not a real-time system. Accordingly, the development of a reference HHT Data Processing Real-Time System (HHT-DPS-RT) with 2-D capabilities or HHT2 to process large images may be beneficial.

SUMMARY

Certain embodiments of the present invention may provide solutions to the problems and needs in the art that have not yet been fully identified, appreciated, or solved by current HHT-DPS system. For example, embodiments of the present invention pertain to a 1-D real-time Hilbert-Huang Transform (HHT1) data processing system with 2-D capabilities (HHT2).

In one embodiment, a computer program is implemented on a computer-readable storage medium. The computer program, when executed, is configured to cause a processor to construct an upper envelope and lower envelope for an input image based on a pixel window parameter, and smooth the upper envelope and lower envelope based on average of elements in a window. The sum of elements in the pixel window is divided by a number of non-zero elements in the sum of elements in the window. This average may then replace the pixel magnitude.

In another embodiment, a computer-implemented method includes constructing an upper envelope and lower envelope for an input image based on a pixel window parameter, and smoothing the upper envelope and lower envelope based on an average of elements in a window. The sum of elements in the window may be divided by a number of non-zero elements in the sum of elements in the window. This average may then replace the pixel magnitude.

In yet another embodiment, an apparatus includes a physical memory including a computer program, and a processor coupled to the physical memory. The computer program is configured to cause the processor to construct an upper envelope and lower envelope for an input image based on a pixel window parameter, and smooth the upper envelope and lower envelope based on a sum of elements in a window. The sum of elements in the window may be divided by a number of non-zero elements in the sum of elements in the window. This average may then replace the pixel magnitude.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 illustrates an HHT-DPS-RT method with 2-D capabilities, according to an embodiment of the present invention.

FIG. 3 illustrates a method for optimizing the process of finding adjacent extrema in a local map of maxima, according to an embodiment of the present invention.

FIG. 4 illustrates a method for embedding an image window, according to an embodiment of the present invention.

DETAILED DESCRIPTION OF THE EMBODIMENTS

Figure 1:
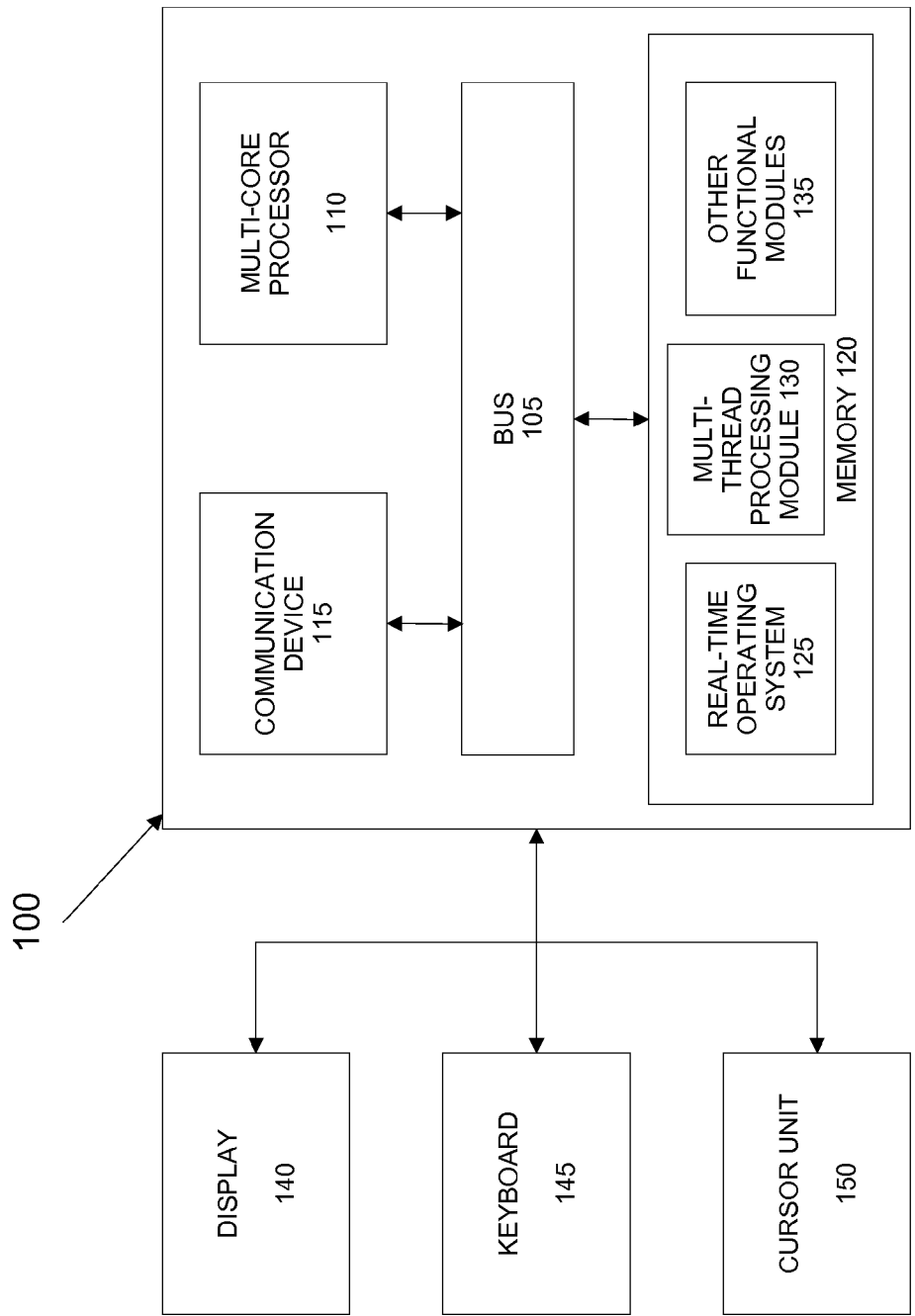
FIG. 1 illustrates a block diagram of a real-time data processing system with 2-D capabilities, according to an embodiment of the present invention.

It will be readily understood that the components of the present invention, as generally described and illustrated in the figures herein, may be arranged and designed in a wide variety of different configurations. Thus, the following detailed description of the embodiments of an apparatus, a system, a method, and a computer readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

One or more embodiments of the present invention pertain to a reference HHT Empirical Mode Decomposition for 2-D (EMD2) algorithms that require high capability computing, and an introduction to HHT2 spectrum concepts.

The primary motivation for the development of HHT1 and reference HHT2 is the need for a reference spectral analysis engineering tool by newer spaceflight instruments to process 1-D and 2-D data from non-linear and non-stationary sources onboard instrumentation of a spacecraft. The reference HHT2 system may be used by other alternative developments of HHT for 2-D to compare, or refer to, results against the HHT2 reference open source implementation. The goal is to develop a fast reference HHT2 similar to the HHT-DPS, which became a reference engineering tool for 1-D.

HHT1 may be extended to HHT2 for processing two-dimensional data (2-D images). The main problem in developing HHT2 is that its computational complexity is estimated as $O(N^4) \sim O(10^{14})$ for N=2048. In the state-of-the-art, images of up to N=512 can be considered. However, in HHT2, a typical image size may be N=2048.

Furthermore, it may be computationally difficult to build image envelopes in an Empirical Mode Decomposition (EMD2) process for such large images. It may also be difficult to construct envelope prediction points for 2-D. These prediction points may allow extension of the envelopes over the input image boundary (domain) so that the upper envelope $U_{en}$ and lower envelope $L_{en}$ surfaces can be interpolated over the entire image domain, and as a result, the median of the envelopes can be computed over the entire input image. The embodiments described herein determine a computationally feasible prediction method for extremas for the entire input image domain, and construct a computationally feasible algorithm for upper and lower envelope surface fitting.

There may be two methods to develop HHT2. The first method may include proving the HHT2 separability, a property similar to one that allows FFT1 to be used in the computation of FFT2 to process 2-D images. With the HHT2 separability established, HHT1 may be used for computations in HHT2 along columns or rows, or both, of the pre-processed input image such that the pre-processed image columnal (row) extrema set becomes an eigenvector in HHT1. This would yield the $O(N^3)$ computational complexity compared to $O(N^4)$.

The second method may include developing an HHT2 that is independent from HHT1, and using speedup algorithms specifically developed for HHT2. The state-of-the-art experimental approaches may require $O(N^4)$ operations and may require substantial performance improvements for images of size N being larger than 256. To develop an HHT2 prototype version independent from HHT1, a processing speedup technique may be used for HHT2. For example, an embedding technique may be used for image processing that optimizes computation within larger loops.

Also, the EMD2 bottleneck computation process for N=2048 may be partitioned into 64 processes of smaller sizes, i.e., n=256. This allows parallel processing on multiple processing elements ($PE_1$-$PE_{64}$) or as 64 processes on a single powerful microprocessor core. For example, the partitioning of the bottleneck algorithm that generates the adjacent extrema matrices ADMAX, ADMIN could be achieved by partitioning the canonical form of LMMAX or C(LMMAX) into 64 equal consecutive vectors $C_1, C_2 \ldots C_{64}$. The double loop partition $C_i \times C$ may be assigned to $PE_i$.

FIG. 1 illustrates a block diagram of a real-time data processing system 100 with 2-D capabilities, according to an embodiment of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of computer-readable medium. System 100 may also include a communication device 115, such as a network interface card, that may provide access to a network.

The computer-readable medium may be any available media that can be accessed by processor 110. The computer-readable medium may include both volatile and nonvolatile medium, removable and non-removable media, and communication media. The communication media may include computer-readable instructions, data structures, program modules, or other data and may include any information delivery media.

Processor 110 can also be coupled via bus 105 to a display 140, such as a Liquid Crystal Display ("LCD"). Display 140 may display information to the user. A keyboard 145 and a cursor control unit 150, such as a computer mouse, may also be coupled to bus 105 to enable the user to interface with system 100.

According to one embodiment, memory 120 may store software modules that may provide functionality when executed by processor 110. The modules can include an operating system 125 and a processing module 130, as well as other functional modules 135. Operating system 125 may provide operating system functionality for system 100. Because system 100 may be part of a larger system, system 100 may include one or more additional functional modules 135 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like, including those for spaceflight.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 2 illustrates HHT-DPS-RT method 200 with 2-D capabilities, according to an embodiment of the present invention. The method of FIG. 2 may be executed by, for example, the computing system shown in FIG. 1.

Prior to execution of the method shown in FIG. 2, an image larger than the input image may be built, such that an input image can be inserted into the larger image to allow the pixels in the input image to be treated as non-boundary. For example, a first script may be created to include a few large synthetic images, which may be created from a 8 by 8 seed matrix.

A second script, or a control script, may be created to include hard-coded parameters of image size N and window parameter W in order to determine the selection of the algorithm to implement the bottleneck code for EMD2 computations. For example, in certain embodiments, the user may hard code a size parameters pair {N, W} to determine an input image size N, where N is 8, 26, 512, 1024, or 2048, and a window parameter W, where W is 0, 1, 2, or 15 to determine the selection of the bottleneck algorithm. The computed window envelope parameter $W_{en}$ determines the width of the statistical filter used to construct the upper envelope $U_{en}$ and lower envelope $L_{en}$.

In order to initialize the method of FIG. 2, a main script can be invoked to cause the processor to initialize the system parameters {N, W} for all scripts at 202. Once the system parameters are initialized, the extremas may be determined, thus allowing the adjacent extrema points to be found. Initializing each found extrema point to the largest distance, allows the closest extrema to be determined for each extrema point and replace the extrema point with the distance to its closest adjacent extrema. For example, at 204, a local map of maxima LMMAX extremas' adjacent point determination is optimized. The description pertaining to FIG. 3 provides a more detailed explanation of generating a local map of maxima LMMAX extremas' adjacent points. At 206, a local map of minima LMMIN extremas' adjacent points determination is optimized. The local map of minima LMMIN extremas' adjacent points may be generated using a similar method, as described in FIG. 3.

At 208, a window envelope $W_{en}$ is determined based on one or more criteria. In one embodiment, when image size N is less than or equal to 512 and window parameter W is 0 or 2, a single canonical algorithm may be executed to produce the shortest adjacent extrema matrices ADMAX, ADMIN and a window envelope $W_{en}$. It should be appreciated that the canonical form may also facilitate the above-mentioned EMD2 bottleneck process of partitioning into smaller processes to run on multiple PEs for a larger image size N and window parameter $W_{en}$. The EMD2 bottleneck process may include breaking the image into smaller image sizes and processing the smaller images simultaneously. For example, an image of size N may be divided into a plurality of processes of smaller size to facilitate parallel processing on a few processing elements ($PE_1$-$PE_N$). In one embodiment, to generate the shortest adjacent extrema matrices ADMAX, ADMIN, a canonical form of LMMAX C(LMMAX) may be partitioned in a plurality of equal consecutive vectors $C_1, C_2, \ldots C_N$. The double loop partition $C_i \times C$ may be assigned to $PE_i$.

In another embodiment, when, for example, the image size is greater than 512 and window parameter W is large, then the canonical form of adjacent extrema matrices ADMAX, ADMIN may be split into smaller processes to run on a plurality of PEs to determine the pixel window size used in envelope construction ($W_{en}$). This allows fast processing of the image, as the processes are ran simultaneously.

If the above two criteria do not match, then the process of matrices ADMAX, ADMIN generation may attain computation complexity comparable to $O(10^{14})$ and become insurmountable when N is greater than 512. In this case, a window of reasonable size W may be selected to search for nearest extrema for each extrema in the local map of maxima LMMAX or minima LMMIN.

At 210, the window W is embedded. See the method steps shown in FIG. 4 provide a more detailed explanation of step 210.

FIG. 3 illustrates a method 300 for optimizing the determination of adjacent points in a local map of maxima, according to an embodiment of the present invention. The method of FIG. 3 may be executed by, for example, the computing system of FIG. 1. The method includes generating at 302 a local map of maxima LMMAX. For example, a matrix of zeros may be allocated into a hard coded matrix A. When matrix A is used as a seed in N=2048 synthetic matrix, a larger number (e.g., $\sim 5*10^5$) of extremas may be used sufficient to test the computational efficiency of the EMD2 algorithms. In this embodiment, an input image may be read into matrix A when window parameter W is 2, otherwise a synthetic image may be read into matrix A when image size N is greater than 8 and window parameter W is approximately 2.

At 304, an N×N local map of maxima LMMAX and minima LMMIN and its adjacent points is generated based on matrix A, using a partitioning algorithm and an embedded matrix, allowing systematic and fast processing in a big double loop. The may include utilizing the concept of an outer matrix of a known flat pixel bias (e.g., zeroes or (min(min (A))−1) with an embedded smaller input matrix A and then systematic processing (same for each pixel) on each input pixel without any complicated exceptions. This also allows partitioning the double loop between different processing elements. Also, the canonical representation of intermediate results is utilized to allow its processing to be partitioned for running many smaller pieces of EMD2 code on many processing elements. Proof of HHT2 separability allows direct application of HHT1 EMD script to EMD2 local extrema matrices columns or rows. This preserves the 2-D local extrema matrices spatial relations while admitting processing with the computationally effective HHT1 for finding the envelopes meridians/longitudes composition.

FIG. 4 illustrates a method 400 for embedding an image window, according to an embodiment of the present invention. The method of FIG. 4 may be executed by, for example, the computing system of FIG. 1. The method includes constructing at 402 upper envelope $U_{en}$ and lower envelope $L_{en}$ for the input image using the determined window size. At 404, the constructed envelopes are smoothed by summing up elements in a window envelope $W_{en} \times W_{en}$ window and dividing the summed elements by the number of non-zero elements in the summed elements.

At 406, the median of the upper envelope $U_{en}$ and the lower envelope $L_{en}$ is computed, e.g., the sum of the upper envelope $U_{en}$ and the lower envelope $L_{en}$ is divided by 2. At 408, a bi-directional intrinsic mode function (BIMF) is determined. For example, a BIMF may be determined by subtracting the median of the upper envelope $U_{en}$ and the lower envelope from the input image. At 410, the median and BIMF are displayed, and matrices of the median and BIMF are written to files.

The method steps performed in FIGS. 2-4, may be performed by a computer program, encoding instructions for the nonlinear adaptive processor to perform at least the method described in FIGS. 2-4, according to an embodiment of the present invention. The computer program may be embodied on a computer-readable medium. A computer-readable medium may be, but is not limited to, a hard disk drive, a flash device, a random access memory, a tape, or any other such medium used to store data. The computer program may include encoded instructions for controlling the nonlinear adaptive processor to implement the method described in FIGS. 2-4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

In one or more embodiments, for an input image A of size N×N may, two map matrices of local extremas—MMAX, MMIN of size N×N may be determined. The two matrices may be used to build two matrices where the extremas are replaced by the nearest adjacent distance extremas—ADMAX, ADMIN. The statistical pixel window parameter $W_{en}$ may be derived and a window of size $W_{en} \times W_{en}$ may be used over each pixel in input matrix A to construct the envelope values as global max and min for matrix A within the window. Because of the window envelope function $W_{en}$ construction, the local extrema points may naturally belong to the built envelopes.

In certain embodiments, an outer matrix of a known flat pixel bias (e.g., zeros or (min(mina))−1) with an embedded smaller input matrix A may be developed and each input pixel may be systematically processed. In other embodiments, canonical representation of intermediate results may be used to allow processing to be partitioned into a plurality of processing elements.

In yet another embodiment, HHT2 separability may allow direct application of HHT1 EMD script to EMD2 local extrema matrices columns or rows. This preserves the 2-D local extrema matrices spatial relation while admitting processing with the computationally effective HHT1 for determining the envelopes meridians and longitudes composition.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The Hilbert Spectrum for 2-D can be initially obtained by applying the HHT1 along the rows and columns of EMD2 resulting BIMFs and using these spectral components to obtain the instantaneous frequency at each pixel of the input image.

I claim:

1. A computer program embodied on a non-transitory computer-readable medium, the computer program, when executed, configured to cause a space flight instrument processor to:

process 1 dimensional and 2 dimensional data from both non-linear and non-stationary sources onboard spacecraft instrumentation;

proving separability and using computations along both predetermined rows and columns;

inputting an image larger than an input image to treat the input image as a non-boundary image;

separating an input signal of one variable s(t) into a finite set of narrow-band Intrinsic Mode Functions—{$IMF_1(t), IMF_2(t) \ldots IMF_k(t)$} that add up to signal s(t);

applying a Hilbert Transform to each $IMF_i(t)$ signal constituent to obtain a corresponding analytical signal $S_i(t)$;

generating a Hilbert Spectrum {$\omega(IMF_1(t)), \omega(IMF_2(t)) \ldots \omega(IMF_k(t))$} at each domain argument t for signal s(t);

construct image envelopes comprising an upper envelope and lower envelope for an input image based on a pixel window statistical parameter by parallel processing on multiple processing elements ($PE_1$-$PE_{64}$) as 64 processes on a single processor core by partitioning a bottleneck algorithm to generate adjacent extrema matrices ADMAX, ADMIN by partitioning a canonical form of LMMAX and C(LMMAX) into 64 equal consecutive vectors $C_1, C_2 \ldots C_{64}$;

smoothing the upper envelope and lower envelope based on a sum of elements in a window, wherein the sum of elements in the window is divided by a number of non-zero elements in the sum of elements in the window based on the non-boundary image;

creating a first script to include a few large synthetic images larger than the input image to be inserted into the larger image to allow the pixels in the input image to be treated as non-boundary created from a 8 by 8 seed matrix; and creating a second script to include hard-coded parameters of image size N and window parameter W in order to determine a selection of the algorithm to implement bottleneck code for EMD2 computations.

2. The computer program of claim 1, wherein the computer program is further configured to cause the processor to optimize to search a local map of maxima extremas for adjacent points.

3. The computer program of claim 2, wherein the computer program is further configured to cause the processor to generate a local map of maxima extremas based on the input image.

4. The computer program of claim 2, wherein the computer program is further configured to cause the processor to generate a N-by-N local map of maxima extremas based on the input image, a local maxima algorithm, and an embedded matrix.

5. The computer program of claim 1, wherein the computer program is further configured to cause the processor to optimize processing of a local map of minima extremas.

6. The computer program of claim 1, wherein the computer program is further configured to cause the processor to determine a window envelope when image size is less than or equal to 512 and a parameter is equal to 0 or 2.

7. The computer program of claim 1, wherein the computer program is further configured to cause the processor to determine a window envelope for each processing element when image size is greater than 512 and a parameter is equal to 0 or 2.

8. The computer program of claim 1, wherein the computer program is further configured to cause the processor to determine a window envelope when image size is 2048 and a parameter is 15.

* * * * *